United States Patent
Katsumata et al.

(10) Patent No.: US 12,422,350 B2
(45) Date of Patent: Sep. 23, 2025

(54) MULTIPLE-REFLECTION APPARATUS AND MULTIPLE-REFLECTION CELL

(71) Applicant: JASCO CORPORATION, Tokyo (JP)

(72) Inventors: Tomohiro Katsumata, Tokyo (JP); Kazuya Nakagawa, Tokyo (JP); Jun Koshoubu, Tokyo (JP)

(73) Assignee: JASCO CORPORATION, Tokyo (JP)

( * ) Notice: Subject to any disclaimer, the term of this patent is extended or adjusted under 35 U.S.C. 154(b) by 893 days.

(21) Appl. No.: 17/672,349

(22) Filed: Feb. 15, 2022

(65) Prior Publication Data

US 2022/0260816 A1    Aug. 18, 2022

(30) Foreign Application Priority Data

Feb. 16, 2021  (JP) .................................. 2021-22509

(51) Int. Cl.
*G01N 21/03* (2006.01)
*G02B 17/00* (2006.01)
*G02B 26/08* (2006.01)

(52) U.S. Cl.
CPC ....... *G01N 21/031* (2013.01); *G01N 21/0303* (2013.01); *G02B 17/004* (2013.01); *G02B 26/0816* (2013.01); *G01N 2201/0636* (2013.01)

(58) Field of Classification Search
CPC ............... G02B 17/004; G02B 17/023; G01N 21/0303; G01N 21/031; G01N 2201/0636
See application file for complete search history.

(56) References Cited

U.S. PATENT DOCUMENTS

| | | | |
|---|---|---|---|
| 5,949,537 A | | 9/1999 | Inman et al. |
| 6,147,799 A | * | 11/2000 | MacDonald ........... G02B 26/06 359/857 |
| 6,188,475 B1 | | 2/2001 | Inman et al. |
| 9,861,297 B2 | | 1/2018 | Yumoto et al. |
| 2006/0193362 A1 | * | 8/2006 | Kopf .................. H01S 3/08081 372/98 |

(Continued)

FOREIGN PATENT DOCUMENTS

| | | | | |
|---|---|---|---|---|
| CN | 102053063 A | * | 5/2011 | ........... G01N 21/031 |
| JP | 2001-509595 | | 7/2001 | |

(Continued)

*Primary Examiner* — Nicholas R. Pasko
(74) *Attorney, Agent, or Firm* — Greenblum & Bernstein, P.L.C.

(57) ABSTRACT

A multiple-reflection apparatus and a multiple-reflection cell includes: a pair of parallel plane mirrors that multiply reflects a laser light, in zigzag, which enters at a specific angle of incidence; a right-angle double mirror having two perpendicular reflection surfaces for returning the multiple-reflection light that traveled to one end between the parallel plane mirrors; and a right-angle double mirror having two perpendicular reflection surfaces for returning the multiple-reflection light that traveled from the right-angle double mirror on one end side to the other end between the parallel plane mirrors. When the two parallel mirror surfaces configuring the parallel plane mirrors are disposed to be parallel to the z-x plane of the x-y-z axial coordinate system, the two reflection surfaces configuring the right-angle double mirror are perpendicular to the x-y plane, and the laser light entering at the angle φ of incidence crosses the x-y plane at a specific angle.

11 Claims, 8 Drawing Sheets

(56) References Cited

U.S. PATENT DOCUMENTS

2016/0331270 A1 11/2016 Yumoto et al.
2017/0139191 A1* 5/2017 Paul .................... G01N 21/031
2019/0049364 A1* 2/2019 Rubin .................. G01N 21/031

FOREIGN PATENT DOCUMENTS

| WO | 99/02969 | 1/1999 |
| WO | 2015/033582 | 3/2015 |

* cited by examiner

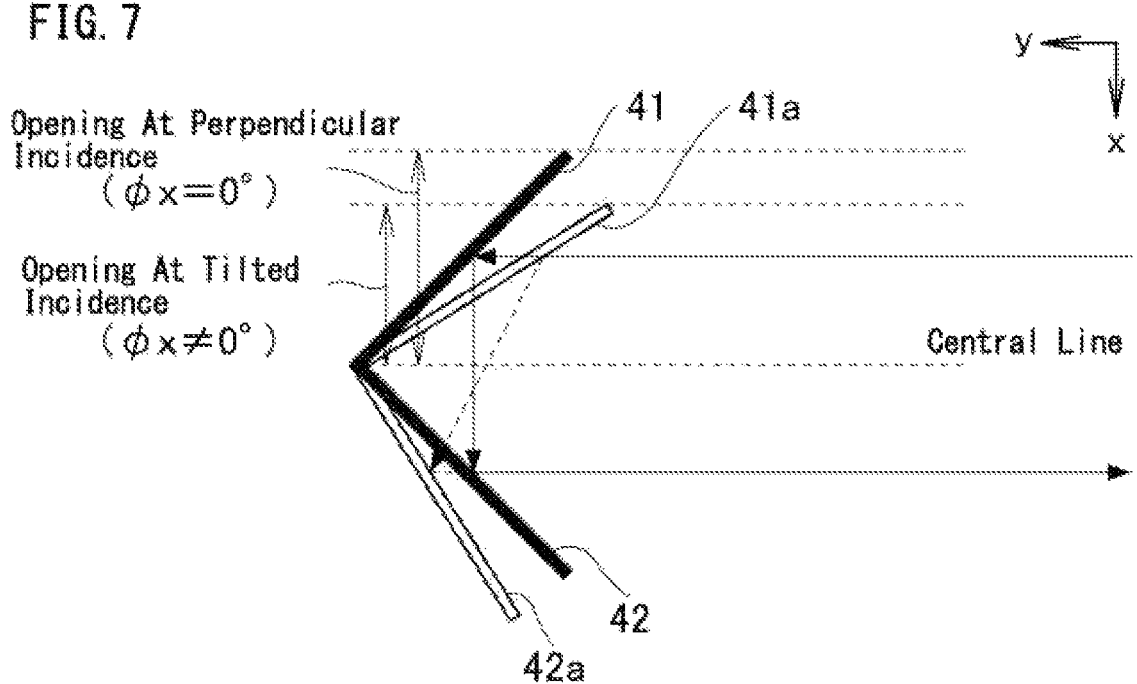

MULTIPLE-REFLECTION APPARATUS AND MULTIPLE-REFLECTION CELL

RELATED APPLICATION

This application claims the priority of Japanese Patent Application No. 2021-022509 filed on Feb. 16, 2021, the disclosure of which is incorporated herein by reference in its entirety.

TECHNICAL FIELD

The present invention relates to a multiple-reflection apparatus that multiply-reflects a laser light between a pair of mirror surfaces to optically analyze a measurement target substance such as gas between the mirror surfaces, and particularly to a multiple-reflection cell having the multiple-reflection apparatus incorporated in a cell.

BACKGROUND ART

An example of gas analysis includes measurement of concentrations of impurity gases of a few ppm or less contained in high-purity gases based on their absorbance. In such gas analysis, a multiple-reflection (multi-pass) cell that can secure a longer optical path is suitable among the cells of the same volumes, and a Herriott cell having a pair of concave spherical mirrors disposed inside the cell is a representative example.

Whereas, in recent gas analysis by an infrared absorption method, a quantum cascade laser having an extremely higher power and an excellent directivity (small angle of divergence) compared with conventional high luminance ceramic light sources or halogen lamps tends to be adopted as a light source (e.g., paragraph [0044] of Patent Literature 1, paragraphs [0002] and [0021] of Patent Literature 2)

CITATION LIST

Patent Literature

Patent Literature 1: Japanese Unexamined Patent Publication (Translation of PCT Application) No. 2001-509595 A Patent Literature 2: International Publication No. WO2015/033582 A1

SUMMARY OF INVENTION

Technical Problem

However, the gas cell of Patent Literature 1 (paragraph [0016], FIG. 1) is a conventional Herriott type, and a conventional Herriott type is also used in Patent Literature 2 (paragraph [0022], FIG. 3). Therefore, it cannot not be said that the structure of the gas cell utilizes the advantage of the quantum cascade laser sufficiently.

The present invention has been made in view of the problems of the above-described conventional art, and an object thereof is to provide a multiple-reflection apparatus and a multiple-reflection cell that is suitable for a laser light having a high power and a good directivity.

Solution to Problem

In order to achieve the above-described object, the multiple-reflection apparatus according to the present invention comprises:

a pair of parallel plane mirrors that multiply reflects a laser light, in zig zag, which enters at a specific angle $\varphi$ of incidence;

a right-angle double mirror on one end side having two perpendicular reflection surfaces for returning a multiple-reflection light that travelled to one end between the parallel plane mirrors, and a right-angle double mirror on the other end side having two perpendicular reflection surfaces for returning the multiple-reflection light again that travelled from the right-angle double mirror on one end side to the other end between the parallel plane mirrors.

Here, when two parallel mirror surfaces that configure the parallel plane mirrors are disposed to be parallel to the z-x plane of the x-y-z axis coordinate system, the two reflection surfaces configuring the right-angle double mirror are perpendicular to the x-y plane, and the laser light entering at the angle ($\varphi$) of incidence crosses the x-y plane at a specific angle ($\varphi z$).

Configurations named with "mirror" herein such as the plane mirror refer to optical members having a plane mirror surface formed at least on one part thereof, and examples thereof include a prism having a reflection coating on the surface.

With reference to the view of the configuration of the above-described multiple-reflection apparatus from the z-axis direction (e.g., FIG. 1A), the laser light multiply reflects at a specific angle $\varphi x$ of incidence between the parallel plane mirrors, and travels toward to one end of the parallel plane mirror. "$\varphi x$" denotes an angle of which the angle $\varphi$ of incidence of the laser light is projected to the x-y plane. Reflection spots are formed on the mirror surface at a constant pitch Px. The multiple-reflection light that traveled to one end between the parallel plane mirrors reflects a first reflection surface of the right-angle double mirror on one end side, and the reflected light subsequently reflects a second reflection surface perpendicular to the first reflection surface. Accordingly, the incident light to the first reflection surface and the reflected light from the second reflection surface in the view from the z-axis direction looks parallel. The multiple-reflection light that is returned on the right-angle double mirror on one end side multiply-reflects between the parallel plane mirrors again, and travels toward the other end. Since the angle $\varphi x$ of incidence of the laser light to the mirror surface of the parallel plane mirror does not change before and after returning, the pitch Px of the reflection spots formed on the mirror surface by the multiple-reflection light that travels toward the other end does not change, too. However, when looking from the z-axis direction, the incident light to the first reflection surface and the reflected light from the second reflection surface are shifted in parallel for an interval dx (they may be shifted in the positive direction of the x-axis, or in the negative direction of the x-axis; and in FIG. 1A, they are shifted in the positive direction), and the positions of the reflection spots on the mirror surface deviate for the shifted amount before and after returning at the right-angle double mirror on one end side. When the multiple-reflection light is returned by the right-angle double mirror on the other end side, it becomes similar to the one end side.

The laser light entering at the angle $\varphi$ of incidence in the above-described multiple-reflection apparatus is not parallel to the x-y plane, but crosses the x-y plane at the angle $\varphi z$ (e.g., refer to the stereographic view of FIG. 2). Accordingly, in the view of the multiple-reflection apparatus from the y-axis (e.g., FIG. 1B), the alignment direction of the reflection spots on the mirror surface of the parallel plane mirror does not become parallel to the x-axis, and forms an angle θ (upward angle or downward angle) with the x-axis. The alignment direction of the reflection spots returned by the right-angle double mirror on one end side also forms the angle θ with the x-axis.

In regard to interference of the beam of the laser light, interference of the beam (such as beam strengthening each other, or deleting each other) occurs when the reflection spots on the mirror surface overlap with each other. Therefore, when measuring a measurement target substance between the mirror surfaces of the multiple-reflection apparatus, such interference of the beam is preferably avoided as much as possible.

From the above, use of the multiple-reflection apparatus of the present invention comprising the pair of parallel plane mirrors and the right-angle double mirrors on both ends thereof enables the numerous reflection spots formed on the mirror surface by the laser light that enters at the specific angle φ of incidence to be in a dense state without overlapping with each other. Accordingly, a long optical path can be effectively formed in a limited volume between the mirror surfaces, and influence to the measurement light by interference of the beam can be suppressed to a low level.

Moreover, in the multiple-reflection apparatus of the present invention, the right-angle double mirror has the first reflection surface and the second reflection surface perpendicular to each other. When the optical path of the multiple-reflection light between the parallel plane mirrors is projected to the x-y plane, the interval (dx) between the optical path of the laser light that is incident on the first reflection surface and the optical path of the laser light that is returned by the second reflection surface after reflecting the first reflection surface preferably has a length of a half pitch of the multiple-reflection light between the parallel plane mirrors.

"One pitch" as used herein refers to a distance that the laser light travels to a direction of travel of the multiple-reflection light when the laser light reciprocates between the parallel plane mirrors for one time. In other words, it is equal to the interval of the reflection spots formed on one mirror surface in accordance with multiple-reflection between the parallel plane mirrors. In the present invention, the above-described interval (dx) of the optical path of the laser light is set to a length of a half pitch of the laser light that multiply reflects, so that the reflection spots on the mirror surface can be formed in a dense state without overlapping with each other most effectively.

Moreover, the multiple-reflection apparatus of the present invention preferably comprises an optical element for incidence that guides the laser light to the mirror surface, and a drive device for incidence that changes the position and direction of the optical element for changing the angle φ of incidence. Or, the multiple-reflection apparatus of the present invention preferably comprises an optical element for incidence that guides the laser light to the mirror surface, and a drive device for the parallel plane mirrors that changes the positions and directions of the parallel plane mirrors and the right-angle double mirrors integrally relative to the optical element for incidence for changing the angle φ of incidence.

According to this configuration, when the angle φ of incidence of the laser light to the parallel plane mirror is changed, the pitch of the multiple-reflection light increases or decreases. Accordingly, the optical path length of the laser light that multiply reflects between the parallel plane mirrors can be adjusted.

The drive device preferably changes the angle (φ) of incidence such that the angle (φx) of which the angle (φ) of incidence is projected to the x-y plane changes within a range of 0° to 25°.

The angle φx of which the angle φ of incidence is projected to the x-y plane is also called as an "azimuth" herein. For example, the parallel plane mirror and the right-angle double mirror are configured integrally, the laser light is made incident on the parallel plane mirror perpendicularly (φx=0°), and the laser light is made incident on the first reflection surface of the right-angle double mirror at 45°. When the angle (φx) of incidence of the laser light is increased from 0° to "0°+x (x>0°)", the angle of incidence to the first reflection surface (or the angle of reflection from the second reflection surface) becomes "45°+x", and the opening of the first reflection surface (or the second reflection surface) to the direction of travel of the laser light becomes small. If the opening of the reflection surface becomes small, a part of the laser light will not be reflected and the reflection ability of the right-angle double mirror may become insufficient.

Hence, in the configuration of the present invention, when the size of the opening of the first reflection surface (or the second reflection surface) at perpendicular incidence (φx=0°) is regarded as 100%, the upper limit of the angle φx of incidence is set to 25°, so that the size of the opening can be secured for 50% or greater. As a result, reflection ability of the right-angle double mirror can be sufficiently maintained when the angle φ of incidence is changed by the drive device.

The drive device preferably changes the angle (φz) between the incident direction of the laser light and the x-y plane such that the times of reciprocation of the multiple-reflection light between the right-angle double mirrors on one side and the other side increases or decreases for N times (N is an integer of 1 or greater).

The angle φz between the incident direction of the laser light and the x-y plane is also called to as an "angle of elevation" herein. According to the configuration of the present invention, since the times of reciprocation of the multiple-reflection light between the right-angle double mirrors are increased or decreased by changing this angle of elevation φz, the optical path length between the parallel plane mirrors can be finely adjusted for each optical path of one reciprocation.

Moreover, the drive device preferably changes the angle (φx) of which the angle (φ) of incidence is projected to the x-y plane such that the times of reciprocation of the laser light between the parallel plane mirrors from the right-angle double mirror on one end side to the right-angle double mirror on the other end side increase or decrease for M times (M is an integer of 1 or greater).

According to the configuration of the present invention, since the times of reciprocation of the laser light between the parallel plane mirrors are increased or decreased by changing the angle φx (azimuth) of which the angle φ of incidence is projected to the x-y plane, the optical path length between the parallel plane mirrors can be finely adjusted for each optical path of one reciprocation.

The multiple-reflection cell according to the present invention comprises the above-described multiple-reflection apparatus, and a cell body configured to be capable of taking in and out the measurement target substance, and having any one configuration of:

a configuration that the multiple-reflection apparatus is incorporated in the cell body, a configuration that the cell body is disposed between the parallel plane mirrors of the multiple-reflection apparatus, and a configuration that a part of the cell body is formed by the multiple-reflection apparatus.

Advantageous Effects of Invention

By comprising the above configurations, the multiple-reflection apparatus and the multiple-reflection cell that is suitable for a laser light having a high power and a good directivity can be provided.

BRIEF DESCRIPTION OF DRAWINGS

FIG. 7 is to describe that the size of the opening of the right-angle double mirror changes in accordance with the size of the angle of incidence.

DESCRIPTION OF EMBODIMENTS

Embodiments of the multiple-reflection apparatus and the multiple-reflection cell comprising the same according to the present invention are described with reference to the drawings hereinbelow.

Figure 1A:
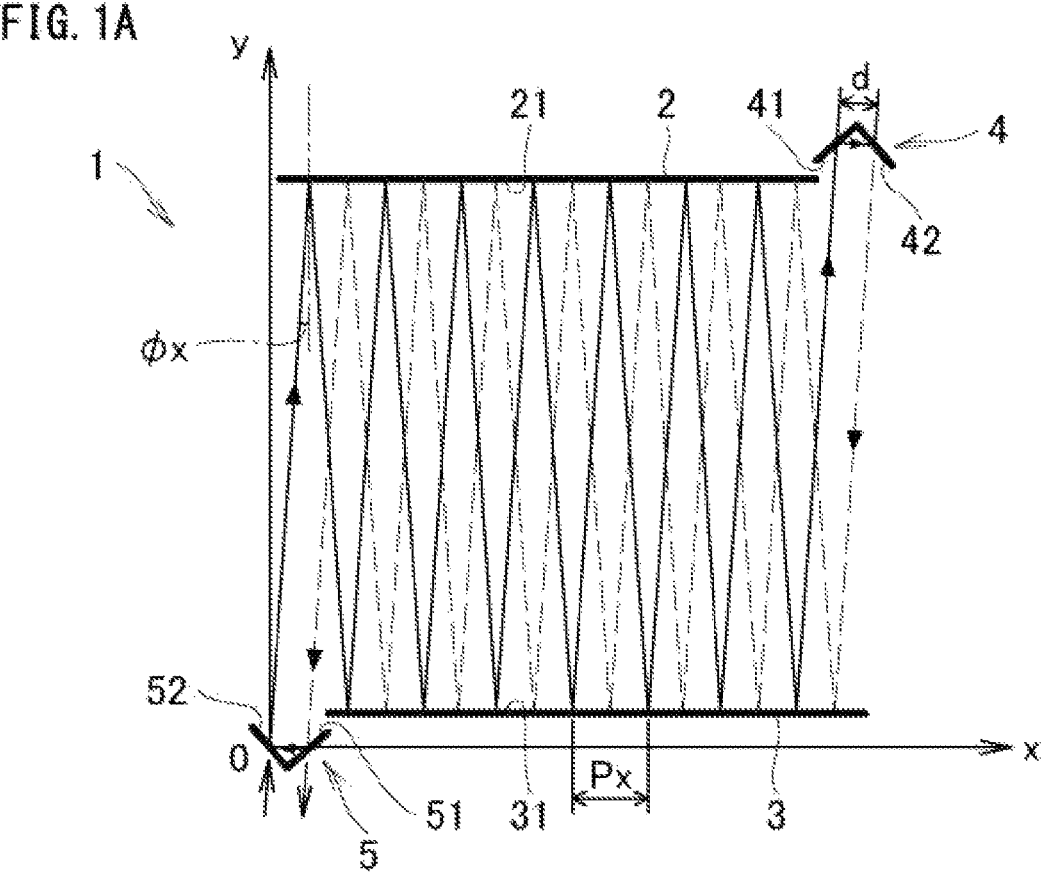
FIG. 1A is a view of an optical path of a multiple-reflection light that is generated between mirror surfaces of a multiple-reflection apparatus of one embodiment from the z-axis.
Figure 1B:
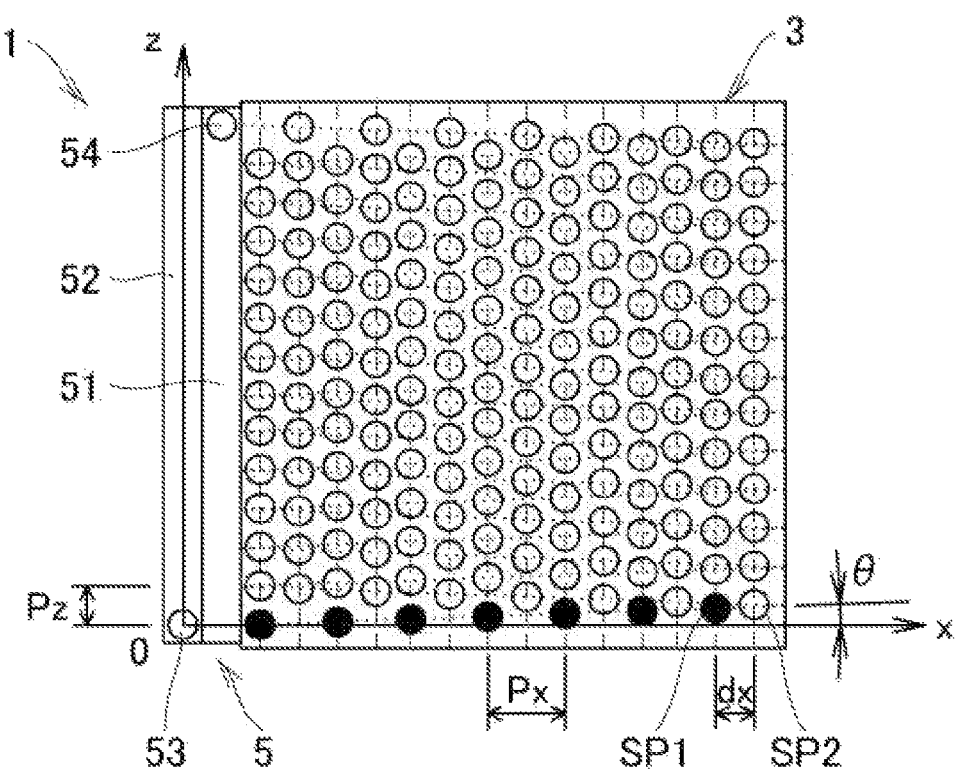
FIG. 1B is a view of the multiple-reflection apparatus from the y-axis.

The multiple-reflection apparatus 1 of the present embodiment is shown in FIG. 1A and FIG. 1B. The multiple-reflection apparatus 1 comprises: a pair of parallel plane mirrors 2, 3; a right-angle double mirror 4 provided at one end of the parallel plane mirror 2; and a right-angle double mirror 5 provided at the other end of the parallel plane mirror 3. Mirror surfaces 21, 31 of the parallel plane mirrors 2, 3 are square shaped, for example, and are disposed to face each other in parallel. For explanation, the mirror surfaces 21, 31 are parallel to the z-x plane of the x-y-z axial coordinate system. FIG. 1A is a view of the multiple-reflection apparatus 1 from the z-axis direction, and FIG. 1B is a view of the multiple-reflection apparatus 1 from the y-axis direction. In regard to a space between the pair of parallel plane mirrors 2, 3, an end in the positive direction of the x-axis is called as "one end", and an end in the negative direction of the x-axis is called as "other end" herein.

The right-angle double mirror 4 has a first reflection surface 41 disposed along the edge of the mirror surface 21, and a second reflection surface 42 of the same shape and perpendicular to the first reflection surface 41. An intersection line of the two perpendicular reflection surfaces 41, 42 is parallel to the z-axis. That is, the reflection surfaces 41, 42 are perpendicular to the x-y plane.

Similarly, the right-angle double mirror 5 has a first reflection surface 51 disposed along the edge of the mirror surface 31, and a second reflection surface 52 of the same shape and perpendicular to the first reflection surface 51. An intersection line of the two perpendicular reflection surfaces 51, 52 is parallel to the z-axis. That is, the reflection surfaces 51, 52 are perpendicular to the x-y plane.

Commercially available optical elements such as roof top mirrors, roof prism mirrors, or perpendicular prism mirrors (reflection coating on surfaces configuring a right angle) may be used as the right-angle double mirrors 4, 5. Moreover, the parallel plane mirrors 2, 3 and the right-angle double mirrors 4, 5 may be formed integrally.

As shown in FIG. 1B, an incident hole 53 of the laser light entering from outside is formed on the end in the negative direction of the z-axis of the second reflection surface 52 of the right-angle double mirror 5, and the laser light that entered from this incident hole 53 multiply-reflects between the parallel plane mirrors 2, 3 in zigzag, and travels to one end side. The position of the incident hole 53 will be described as an origin O of the x-y-z axial coordinate system hereinafter.

The laser light that entered from the incident hole 53 reflects the mirror surfaces 21, 31 at the angle φ of incidence alternately. The mirror surfaces 21, 31 are parallel, and the laser light having a high directivity is used; therefore, the angle φ of incidence is kept constant, and the shapes of the reflection spots on the mirror surfaces 21, 31 are also kept constant. The angle φx of FIG. 1A is the angle of which the angle φ of incidence is projected to the x-y plane, and corresponds to the "azimuth" of when the x-y plane is a horizontal plane.

On the points where the laser light reflects the mirror surfaces 21, 31, circular reflection spots according to its beam diameter are formed. Since the angle φ of incidence of the laser light relative to the mirror surfaces 21, 31 has a component of the azimuth (angle φx), these reflection spots are formed at a constant pitch Px.

In the example of FIG. 1A, the laser light reciprocates between the mirror surfaces 21, 31 for seven times, and then travels to the first reflection surface 41 of the right-angle double mirror 4. The numerous small circles aligned at the pitch Px on the mirror surface 3 of FIG. 1B show the reflection spots. The small black circles are seven reflection spots formed when the multiple-reflection light travels from the incident hole 53 to the first reflection surface 41. The pitch Px is a component in the x-axis direction of the pitch P of the reflection spots.

Figure 2:
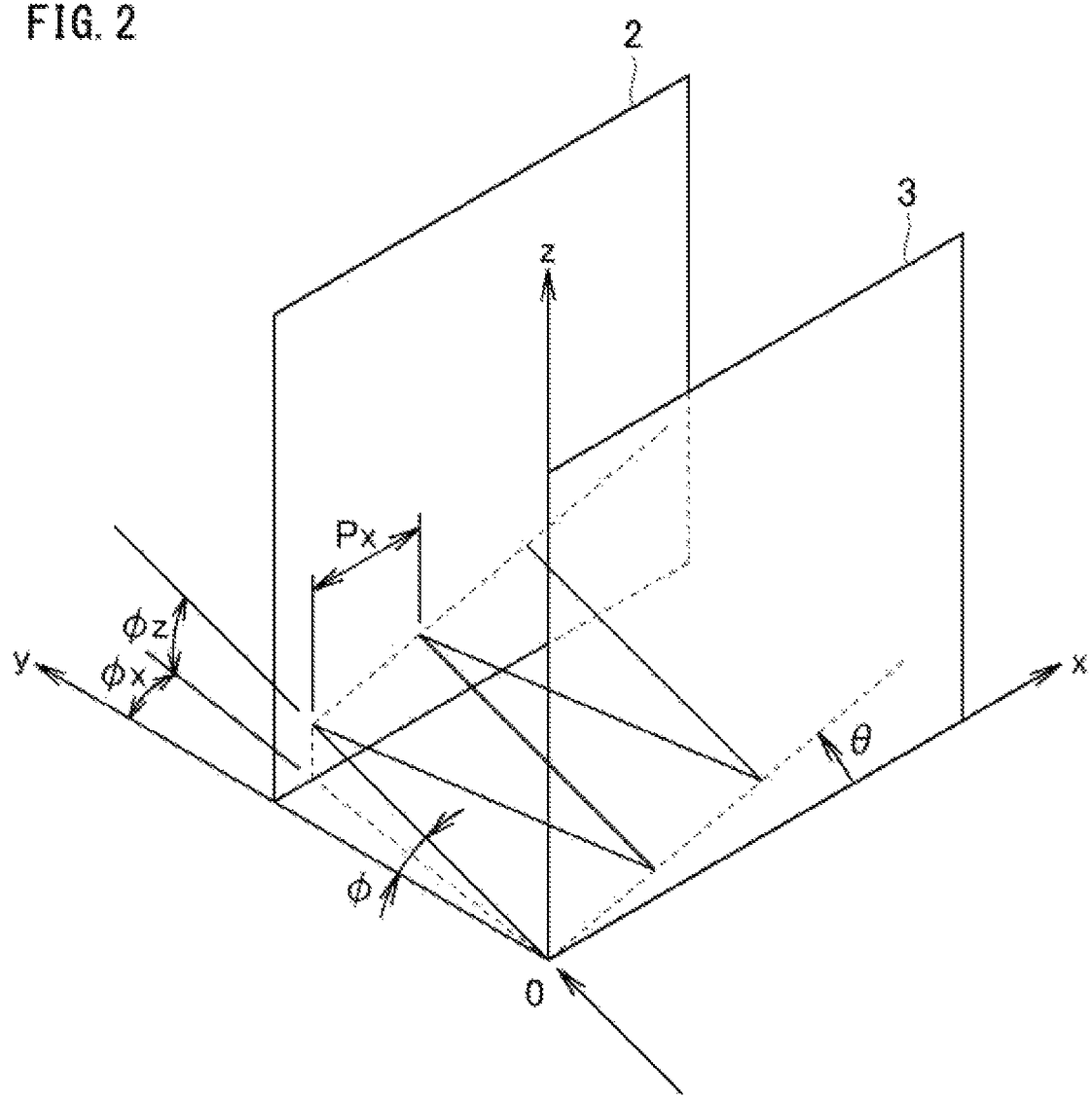
FIG. 2 is a stereographic perspective view for describing an angle φ of incidence of a laser light to the mirror surface.

Moreover, since the angle φ of incidence of the laser light has a component of the angle of elevation (angle φz), the alignment direction of the small black circles of FIG. 1B becomes the direction having an upward angle θ relative to the x-axis. The stereographic perspective view of FIG. 2 shows relation between the angle φ of incidence and the upward angle θ. The angle φx is an angle of which the angle φ of incidence is projected to the x-y plane; whereas, the angle φz is equal to the angle between the incident light that enters from the incident hole 53 (origin O) and the x-y plane.

As in FIG. 1A, the laser light that is incident on the first reflection surface 41 on one end side reflects the first reflection surface 41 and the second reflection surface 42 sequentially. In the view of which the optical path of the laser light is projected to the x-y plane, since the first reflection surface 41 and the second reflection surface 42 are perpendicular to each other, the incident light to the first reflection surface 41 and the reflected light from the second reflection surface 42 become parallel regardless of the angle of incidence relative to the first reflection surface 41. However, in the view of which the optical path of the laser light is projected to the y-z plane, since the angle φ of incidence of the laser light has the component of the angle of elevation (φv), the incident light to the first reflection surface 41 and the reflected light from the second reflection surface 42 forms an angle (2φz) that is double the component of the angle of elevation.

As described above, the right-angle double mirror 4 returns the multiple-reflection light that travelled to one end to the other end, and the returned multiple-reflection light travels to the direction of the upward angle θ relative to the x-axis similarly.

The reflection spots of the multiple-reflection light returned by the right-angle double mirror 4 are formed at positions that are deviated for a half of the pitch Px relative to the reflection spots shown with the small black circles as shown in FIG. 1B. In FIG. 1A, the interval between the incident light to the first reflection surface 41 and the reflected light from the second reflection surface 42 is denoted as d. As shown in FIG. 1B, a component dx in the x-axis direction of the interval between a reflection spot SP1 on the mirror surface 31 regarding the incident light to the first reflection surface 41 and a reflection spot SP2 on the mirror surface 31 regarding the reflected light from the second reflection surface 42 is equal to a half pitch (Px/2) of the multiple-reflection light.

The multiple-reflection light that travels to the other end side in a state that is deviated for a half pitch in the x-direction by the right-angle double mirror 4 reciprocates between the mirror surfaces 21, 31 for seven times, and then is returned by the right-angle double mirror 5 on the other end side again. The right-angle double mirrors 4, 5 are provided as rotational-symmetry to each other, and the multiple-reflection light is returned on the other end side like in the one end side.

That is, the component in the x-axis direction of the interval between the reflection spot on the mirror surface 21 regarding the incident light to the first reflection surface 51 and the reflection spot on the mirror surface 21 regarding the reflected light from the second reflection surface 52 is the same as dx, and is equal to a half pitch (Px/2) of the multiple-reflection light. Then, the multiple-reflection light returned by the other end side forms a similar optical path from the position that is deviated for one pitch (Pz) in the z-axis direction relative to the optical path of multiple reflection of the laser light that entered from the incident hole 53, and travels to the one end side.

As described, the multiple-reflection light reciprocates between the right-angle double mirrors 4, 5 for a plurality of times, and travels to the z-axis direction in zigzag. In the present embodiment, the two reflection surfaces 41, 42 of the right-angle double mirror 4 are long along its intersection line (z-axis direction), and the reflection surfaces 51, 52 of the right-angle reflection mirror 5 are similarly long. Accordingly, when the multiple-reflection light reciprocates between the right-angle double mirrors 4, 5 for a plurality of times, the returning points on the right-angle double mirrors 4, 5 move for a specific pitch (Pz) along its intersection line each time. The pitch Pz in the z-axis direction is kept constant. In the example of FIG. 1B, after reciprocating between the right-angle double mirrors 4, 5 for thirteen times, the laser light exits through an exit hole 54 formed on an end in the positive direction of the z-axis of the first reflection surface 51 of the right-angle double mirror 5. The incident hole 53 and the exit hole 54 may be capable of transmitting the laser light, and are formed by an infrared-transmissive window plate such as ZnS (zinc sulfide), ZnSe (zinc selenide), Si (silicon), Ge (germanium), or diamond suitably selected in accordance with the wavenumber range of the laser mounted to the optical analysis device (e.g., in a case of QCL light source, oscillation of from mid-infrared to far-infrared band is assumed), or glass.

Figure 3A:
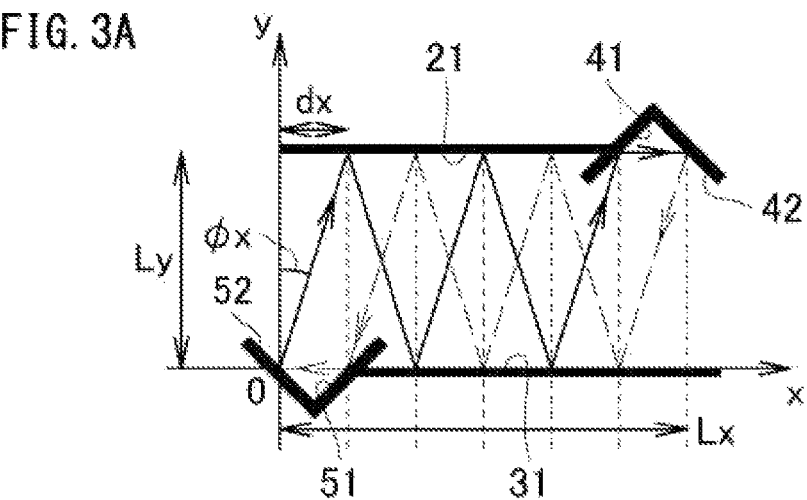
FIG. 3A to 3C are to describe how the multiple-reflection light that is generated in the multiple-reflection apparatus travels.
Figure 3B:
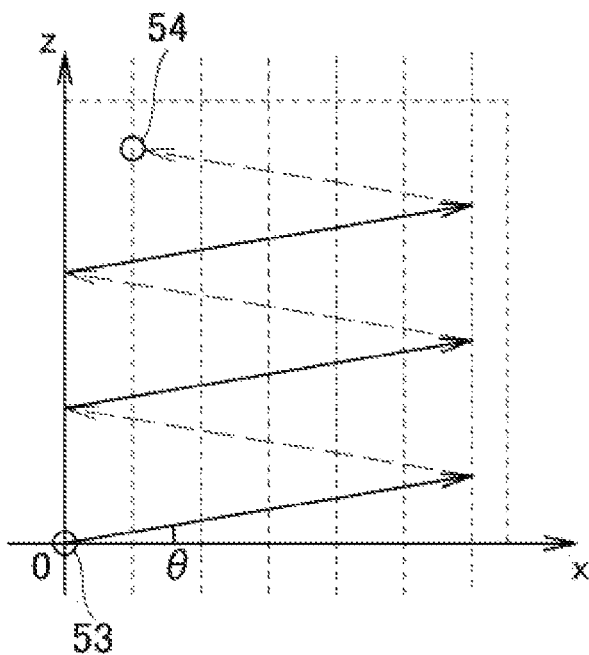
Figure 3C:
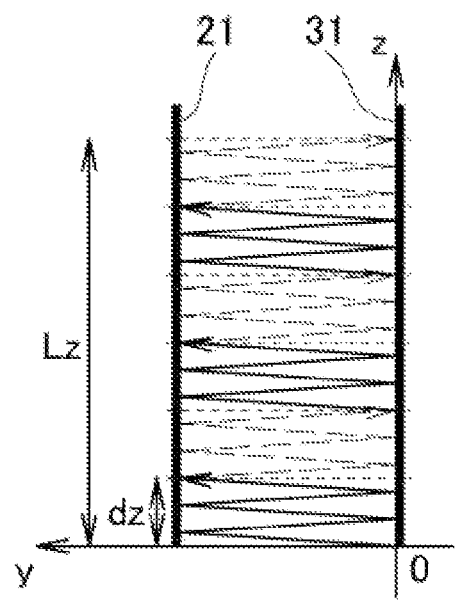

FIG. 3A to 3C show simplified configuration of the multiple-reflection apparatus 1 of the present embodiment to describe the effect more simply. FIG. 3A is a schematic view of the multiple-reflection apparatus 1 from the z-axis direction, and the angle of which the incident angle φ is projected to the x-y plane is denoted as φx. FIG. 3B is a schematic view of the multiple-reflection apparatus 1 from the y-axis direction, and the upward angle of the multiple-reflection light between the mirror surfaces 21, 31 is denoted as θ. The multiple-reflection light that travels from the other end to the one end is shown with a solid line, and the multiple-reflection light that travels from the one end to the other end is shown with a dashed line.

As is clear from FIGS. 3A and 3B, the condition for the laser light to exit from the exit hole 54 efficiently is that the length (Lx) in the x-axis direction from the returning point (origin O) on the second reflection surface 52 on the other end side to the returning point on the second reflection surface 42 on one end side being an integral multiple of the shifted amount of the optical path on the right-angle double mirrors 4, 5 (same as dx).

Next, FIG. 3C is a schematic view of the multiple-reflection apparatus 1 from the x-axis direction. The amount of travel in the z-axis direction of which the multiple-reflection light travels from the right-angle double mirror 5 on the other end side to the right-angle double mirror 4 on one end side is denoted as dz (a half of the pitch Pz). As is clear from this drawing, the condition for the laser light to exit from the exit hole 54 efficiently is that the length (Lz) in the z-axis direction from the position of the incident hole 53 (origin O) to the position of the exit hole 54 being an integral multiple of the amount of travel (dz) in the z-axis direction.

The disposition of the right-angle double mirrors 4, 5 is not limited to the disposition shown in FIG. 3A, and the right-angle double mirrors 4, 5 may be disposed on both ends of the same mirror surface (2 or 3). Moreover, the positions of the incident hole 53 and the exit hole 54 of the laser light are not limited to the positions shown in FIG. 3B, and they may be formed on any position of the reflection spots of the mirror surfaces 21, 31, or the positions of the returning points of the right-angle double mirrors 4, 5. Moreover, the direction of travel of the laser light of FIG. 3A to 3C may be reversed.

Figure 4:
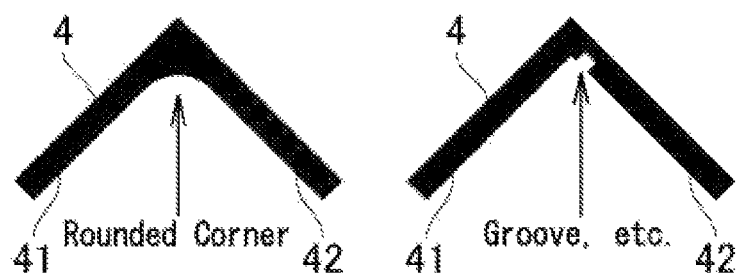
FIG. 4 is to describe a range that requires high precise processing for the right-angle double mirror of the multiple-reflection apparatus.

A range that requires high precise processing for the right-angle double mirror 4 is described with FIG. 4. In the present embodiment, whole surfaces of the reflection surfaces 41, 42 of the right-angle double mirror 4 are not used for reflecting the laser light. Therefore, a high precision processing does not require for the vicinity of the intersection line (joint part) of which the reflection surfaces 41, 42 intersect perpendicularly. The vicinity of the intersection line may be rounded, or a groove may remain as in FIG. 4. Since incompleteness of the right-angle double mirror 4 is acceptable, a metal mirror having a simulated rooftop shape can also be used.

Figure 5:
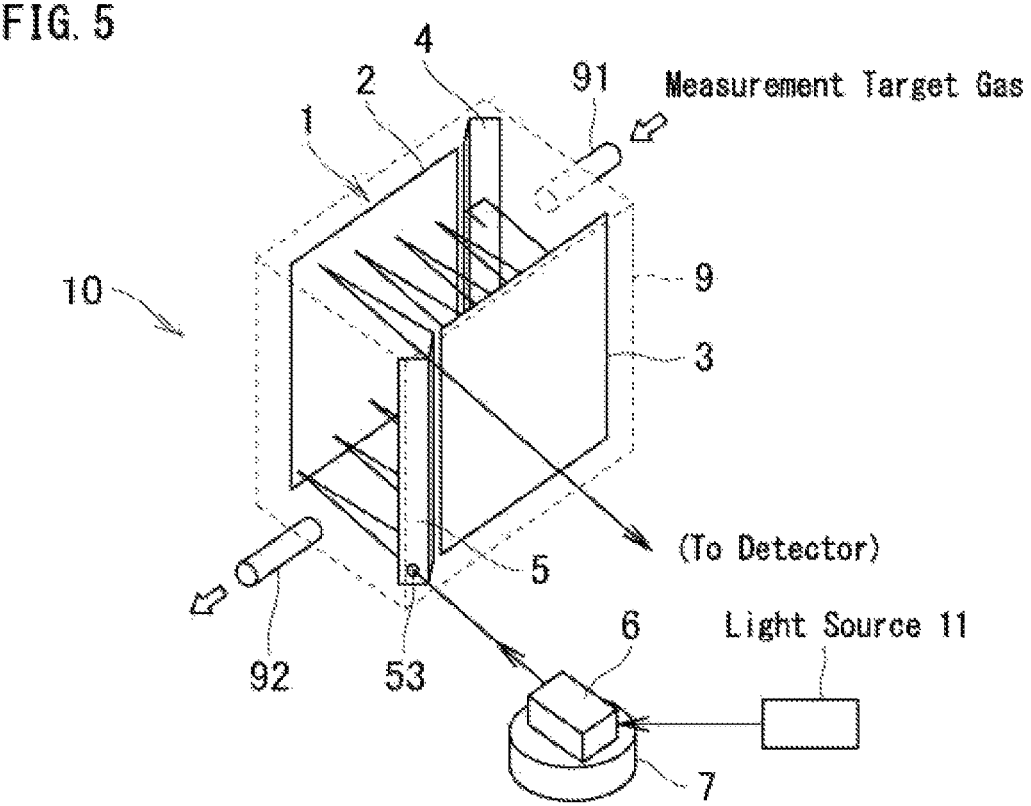
FIG. 5 is a mechanism for adjusting the angle of incidence of the gas cell incorporating the multiple-reflection apparatus.
Figure 6:
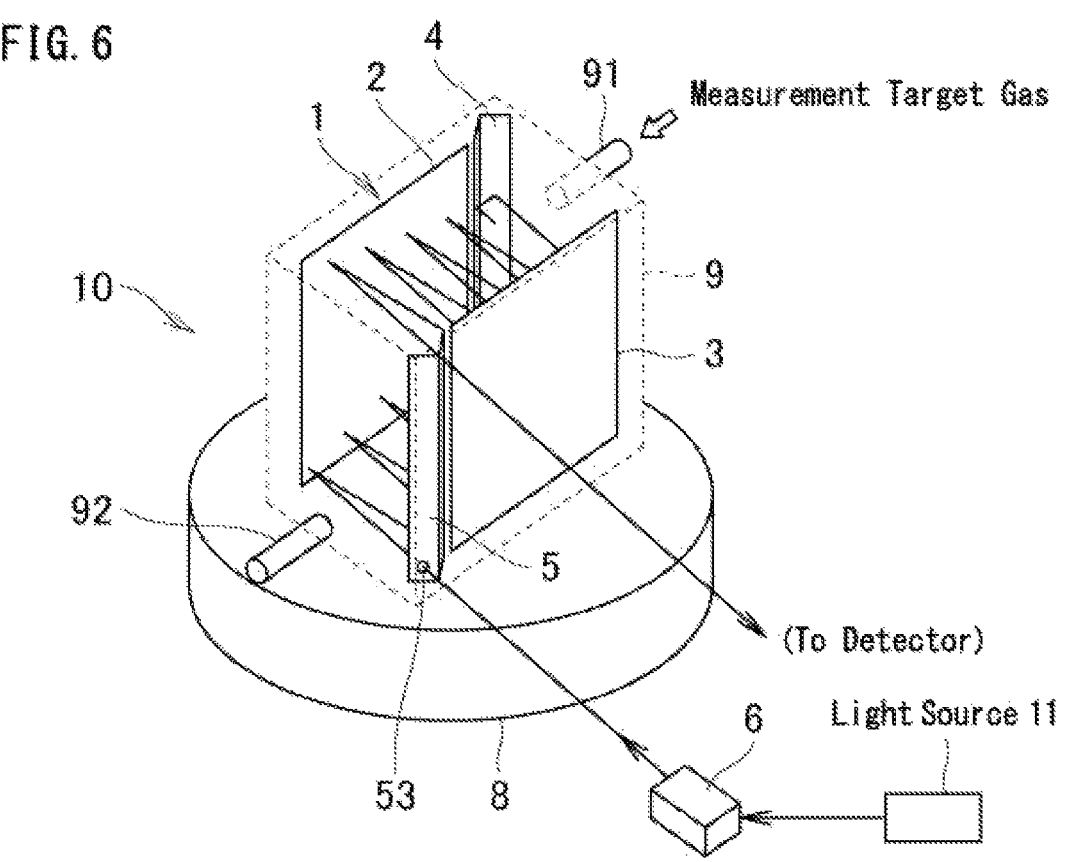
FIG. 6 is another mechanism for adjusting the angle of incidence.

The mechanism for adjusting the incident angle φ of the laser light is described with FIG. 5 to FIG. 7.

A multiple-reflection type gas cell (multiple-reflection cell) 10 incorporating the multiple-reflection apparatus 1 is shown in FIG. 5 and FIG. 6. This gas cell 10 has a cell body 9 configured to be capable of taking in and out the measurement target gas, and the multiple-reflection apparatus 1 is housed in the cell body 9. A gas sending tube 91 and a gas exhausting tube 92 are connected to the cell body 9, and the cell body 9 has an airtight structure other than the connecting parts thereof. The material of the cell body 9 is not particularly limited, as long as the part where the laser light transmits is at least translucent.

In FIGS. 5 and 6, an optical element 6 for making the laser light incident on the multiple-reflection apparatus 1 is disposed outside the gas cell 10. For example, an alignment mechanism by a combination of two plane mirrors assuming 90° reflection can be adopted as the optical element 6 for maintaining polarization property. The configuration of the optical element 6 is not limited thereto, and optical elements of other configurations can also be adopted. The laser light from the light source 11 such as QCLs (quantum cascade lasers) that are excellent in high power and high directivity is guided to the incident hole 53 of the multiple-reflection apparatus 1 via this optical element 6 for incidence. The QCL can achieve an extremely high power compared with conventional high-luminance ceramic light sources or halogen lamps. It can also sweep a narrow band (half width being extremely narrow) infrared laser in the fingerprint region (1850-890 $cm^{-1}$), and is also excellent in directivity (meaning that the angle of divergence is small). However, the light source 11 is not limited to QCLs, and other various lasers having high power and high directivity may be adopted.

In the examples of FIG. 5 and FIG. 6, the gas sending tube 91 is configured to send the measurement target gas to the one end side of the multiple-reflection apparatus 1, and the gas exhausting tube 92 is configured to exhaust the measurement target gas from the other end side of the multiple-reflection apparatus 1; however, the positions of connecting the gas sending tube 91 ang the gas exhausting tube 92 are not particularly limited. Moreover, in the examples of FIG. 5 and FIG. 6, the cell body 9 and the multiple reflection apparatus 1 are configured to be combined; however, the multiple-reflection apparatus 1 may be configured to be a part of the cell body 9 so that the two are configured integrally as the gas cell 10.

In FIG. 5, a drive device 7 of the optical element is provided as a first angle-of-incidence adjuster. For example, the drive device 7 corresponds to an angle adjustment device of an angle-changeable mirror of the optical element 6. The drive device 7 is a rotary tilting stage, for example, and changes the posture of the optical element 6 for incidence to change the angle φ of incidence of the laser light. Moreover, the drive device 7 may have a drive mechanism for moving the position of the optical element 6 along at least one drive-axis other than the above-described rotation-axis. When the optical element 6 is the above-described alignment mechanism of two plane mirrors, for example, the drive part thereof corresponds to this drive device 7.

In FIG. 6, a drive device 8 of the gas cell is shown as a second angle-of-incidence adjuster. This drive device 8 is a device that changes the position and posture of the gas cell 10 to change the angle φ of incidence of the laser light. For example, when there is a limitation for changing the posture and position of the optical element 6, this drive device 8 of the gas cell becomes useful.

At least either of the drive devices 7, 8 changes the angle φ of incidence such that the angle φx of which the angle φ of incidence is projected to the x-y plane changes within a range of 0° to 25°. Either or both of the drive devices 7, 8 may be used. These drive devices 7, 8 can also be used to adjust the position for making the laser light incident on the incident hole 53.

The drive devices 7, 8 are configured to change the angle φz of incidence such that the times of reciprocation of the multiple-reflection light between the right-angle double mirrors 4, 5 on one end side and the other end side increase or decrease for N times (N is an integer of 1 or greater). In the present embodiment, since the right-angle double mirror 4 having two reflection surfaces 41, 42 that are long in the z-axis direction and the right-angle double mirror 5 having the same configuration are used, the times of reciprocation of the multiple-reflection light between the right-angle double mirrors 4, 5 can be increased or decreased easily by only adjusting the angle φz of incidence.

Moreover, the drive devices 7, 8 may be configured to change the angle φx of incidence such that the times that the laser light reciprocates between the mirror surfaces 21, 31 increases or decreases for M times (M is an integer of 1 or greater) between the right-angle double mirror 4 on one end side and the right-angle double mirror 5 on the other end side. In this case, since the pitch Px changes in accordance with the times of reciprocation, it may be better to change the positional relation between the first and second reflection surfaces 41, 42 of the right-angle double mirror 4 and the positional relation between the first and second reflection surfaces 51, 52 of the right-angle double mirror 5 respectively.

By using the multiple-reflection apparatus 1 of the present embodiment as a cell for measuring absorbance of a sample gas, the volume of the measurement target gas required for measurement can be reduced easily. Or, the optical path length of the light that passes through the measurement target gas can be elongated easily, and measurement sensitivity can be improved easily. Or, these effects can be achieved simultaneously.

Since the measurement target gas of the same concentration can be analyzed in a cell of a smaller volume, the time for sending/exhausting the gas to/from the cell becomes shorter. Therefore, when time change of the low-concentration component contained in the measurement target gas is to be measured, for example, it becomes possible to measure the change in a shorter time pitch.

When compared with conventional cells using spherical mirrors, the degree of freedom of optical design improves by using the plane mirrors 2, 3. For example, there will be no limitation in design such as disposition of a pair of spherical mirrors (i.e., designing to make the center of the radius of curvature of one spherical mirror to be on the spherical surface of the opposite side). Optical structure is simplified, production time and cost are reduced, and adjustment of direction of mirrors becomes easier. Moreover, since the structure is not complicated, maintenance becomes easier too.

According to the multiple-reflection apparatus 1 of the present embodiment, numerous reflection spots formed on the mirror surfaces 21, 31 by the laser light that enters at a specific angle φ of incidence can be made into a dense state without overlapping with each other. Accordingly, a long optical path can be formed efficiently in a limited volume between the mirror surfaces 21, 31, and influence to the measurement light by interference of the beam can be suppressed to a low level.

In the present embodiment, the merit of using high-power lasers such as QCL and others is that the power of these lasers is high enough to sufficiently make up for surface reflection loss associated with multiple-reflection between the mirror surfaces (the parallel plane mirrors 2, 3 and the right-angle double mirrors 4, 5).

In conventional devices for measuring infrared absorption (e.g., FTIR), TGS detectors are often mounted as a standard detector. Moreover, MCT detectors capable of detecting weaker lights may be mounted optionally. TGS detectors have lower sensitivity and responsiveness than MCT detectors; however, they have merits of: liquid nitrogen cooling being unnecessary, a relatively large measurement band, and inexpensiveness. Therefore, they are useful in terms of vertical-axis stability of measurement values and long-term measurement. However, since power of conventional infrared light sources is not high enough and power (amount of transmitted light) becomes short by multiple-reflection of about 100 times, TGS detectors could not be used, and thus MCT detectors had to be used. Whereas, a high-power infrared light laser is used in the present embodiment, so that such limitations in selection of detectors are solved, and measurement can be performed with standard detectors such as TGS detectors. This applies to a case when a gas cell for the sample gas is disposed between the parallel plane mirrors 2, 3. Even when the infrared light laser repetitively receives surface reflection loss at the gas cell, shortage of the amount of transmitted light does not occur, and it becomes possible to use standard detectors.

In the present embodiment, the second merit of using the high-power laser such as QCL and others is that the absorption peak of the measurement target substance can be taken out selectively even when the absorption peak of the measurement target substance is near the absorption band of the gas present under environment (e.g., $CO_2$ or $H_2O$) because the spectral width of the infrared light laser is narrow.

Moreover, in the present embodiment, by making the interval between the incident light to the right-angle double mirror 4 and the reflected light (the interval denoted as dx in FIG. 1 (B)) to be equal to the length of the half pitch (Px/2) of the laser light that multiply-reflects between the mirror surfaces 21, 31, the reflection spots on the mirror surfaces 21, 31 can be made into a dense state, and the reflection spots can be formed without overlapping with each other most effectively.

Moreover, by changing the azimuth φx within a range of 0° to 25° by the drive devices 7, 8 of the multiple-reflection apparatus 1 of the present embodiment, the optical path length of the laser light between the mirror surfaces 21, 31 can be adjusted easily. Here, as shown in FIG. 7, when the size of the opening of the first reflection surface 41 (or the second reflection surface 42) at perpendicular incidence (φx=0°) is regarded as 100%, the size of the opening can be secured for 50% or greater by setting the upper limit of the azimuth φx to 25°. Accordingly, reflection ability of the right-angle double mirror 4 (or the right-angle double mirror 5) can be maintained sufficiently even when the azimuth φx is changed.

Here, features of the right-angle double mirror 4 is described with FIG. 7. As in FIG. 7, even when the angle of the reflection surface 41 relative to the incident light is changed within the range of the mirror opening, the reflected light from the reflection surface 42 comes back by passing through the same path before the angle is changed (the path projected to the x-y plane becomes the same). However, it is on the condition that the length from the central line of the right-angle double mirror 4 to the incident light does not change. That is, regardless of the angle of the reflection surface 41, the amount of parallel travel before and after reflection becomes constant. In the present embodiment, assembly and adjustment of the multiple-reflection apparatus 1 became easier by adopting the right-angle double mirrors 4, 5 having such features.

By adjusting the angle φx by the drive devices 7, 8 of FIG. 5 and FIG. 6, the optical path length of the laser light that reciprocates between the mirror surfaces 21, 31 can be finely adjusted for each optical length of one reciprocation. Moreover, the drive devices 7, 8 can adjust the angle φz, and can finely adjust the optical path length of the multiple-reflection light that reciprocates between the right-angle double mirrors 4, 5 on both ends for each optical path of one reciprocation.

For example, a case of measuring an absorption spectrum of a specific component in a sample gas by using the gas cell 10 having the multiple-reflection apparatus 1 of the present embodiment is described. When the sample gas contains a high-absorbance component and a low-absorbance component, and if detection of the high-absorbance component is saturated, measurement of the high-absorbance component can be continued under a condition of the suitable optical path length by shortening the optical path length with an automatic switching mechanism of the optical path length of the present embodiment. That is, the time for re-encapsulating the sample gas can be omitted, and data can be acquired smoothly in different measurement systems by the automatic switching mechanism of the optical path length.

For example, when the shapes of the mirror surfaces 21, 31 of FIG. 1A, 1B are a 50 mm square, and the interval between the mirror surfaces 21, 31 is 50 mm, the laser light reciprocates between the mirror surfaces for about 15 times while it reciprocates between the right-angle double mirrors 4, 5 on both ends for one time. The optical path length thereof is:

$$100 \text{ mm} \times 15 \text{ reciprocations} = 1.5 \text{ m}$$

Furthermore, since the multiple-reflection light reciprocates between the right-angle double mirrors 4, 5 on both ends for 13 times, the total optical path length is:

$$1.5 \text{ m} \times 13 \text{ reciprocations} = 19.5 \text{ m}$$

Such gas cell 10 using the multiple-reflection apparatus 1 can be formed as a box having one side of 80 mm or less (volume of about 512 ml). This is a volume of ¼ or less of conventional gas cells, and the gas cell can be miniaturized. Miniaturized gas cells can be used preferably in a case when there is a limit in the volume of the sample that can be used.

An example of the gas cell of the present embodiment may be a gas cell having a cell chamber consisting of an infrared-transmissive window plate disposed between the pair of parallel plane mirrors 2, 3. The sample gas is encapsulated in the cell chamber between the plane mirrors 2, 3. Or, as described above, a gas cell of which a part of the surface of the cell body 9 is formed by the pair of parallel mirrors 2, 3 of the multiple-reflection apparatus 1 may also be an example.

Moreover, one of which a reflection film is formed on the back surface of the infrared-transmissive window plate may be adopted as the pair of parallel plane mirrors 2, 3. In these gas cells configured like this, the mirror surfaces of the plane mirrors 2, 3 will not become directly dirty with the sample gas (prevention of mirror surface from staining). Although the surface of the infrared-transmissive window plate becomes dirty with the sample gas instead, maintenance becomes easier because it may be wiped off or replaced.

INDUSTRIAL APPLICABILITY

The technique of multiply-reflecting the laser light according to the present invention is not limited to absorption measurement of the gas in a cell, and is also preferred in absorption measurement of the gas in open atmosphere. Moreover, without being limited to absorption measurement, the technique according to the present invention is preferred when taking out a Raman scattering light by exciting the gas in Raman spectrometry, or taking out a fluorescent light by exciting the gas in fluorescence method because the Raman scattering light or fluorescent light that is generated from the gas is extremely weak.

REFERENCE SIGNS LIST

1 Multiple-reflection apparatus
2, 3 Pair of parallel plane mirrors
4 Right-angle double mirror on one end side
5 Right-angle double mirror on the other end side
6 Optical element for incidence
7 Drive device for optical element
8 Drive device for gas cell
9 Cell body
10 Gas cell (multiple-reflection cell)
11 Light source
21 First mirror surface
31 Second mirror surface
41, 51 First reflection surface
42, 52 Second reflection surface
53 Incident hole
54 Exit hole
91 Gas sending tube
92 Gas exhausting tube

The invention claimed is:

1. A multiple-reflection apparatus comprising:
a pair of parallel plane mirrors that multiply reflects a laser light, in zig zag, which enters at a specific angle $\varphi$ of incidence;
a first right-angle double mirror provided on an edge of a first plane mirror, of the pair of parallel plane mirrors, at one end side of the pair of parallel plane mirrors and facing a second plane mirror of the pair of parallel plane mirrors, the first right-angle double mirror having two perpendicular reflection surfaces for returning a multiple-reflection light that travelled to the one end side between the parallel plane mirrors; and
a second right-angle double mirror provided on an edge of the second plane mirror of the pair of parallel plane mirrors at an other end side of the pair of parallel plane mirrors and facing the first plane mirror, the second right-angle double mirror having two perpendicular reflection surfaces for returning the multiple-reflection light again that travelled from the first right-angle double mirror on the one end side to the other end side between the parallel plane mirrors,
wherein two parallel mirror surfaces of the parallel plane mirrors are disposed to be parallel to a z-x plane of an x-y-z axis coordinate system,
the one end side is one end side in an x-axis direction of the x-y-z axis coordinate system,
the other end side is an other end side in the x-axis direction of the x-y-z axis coordinate system, and
the two reflection surfaces configuring the first right-angle double mirror and the two reflection surfaces configuring the second right-angle double mirror are perpendicular to an x-y plane of the x-y-z axis coordinate system, such that the laser light entering at the angle $\varphi$ of incidence crosses the x-y plane at a specific angle $\varphi z$.

2. The multiple-reflection apparatus of claim 1, wherein the first right-angle double mirror has a first reflection surface and a second reflection surface perpendicular to each other, and
in a state in which an optical path of the multiple-reflection light between the parallel plane mirrors is projected to the x-y plane, an interval dx between an optical path of the laser light that is incident on the first reflection surface and an optical path of the laser light that is returned by the second reflection surface after reflecting the first reflection surface has a length being half of a pitch of the multiple-reflection light between the parallel plane mirrors.

3. A multiple-reflection cell comprising:
the multiple-reflection apparatus of claim 1, and
a cell body configured to intake and release a measurement target substance, the multiple-reflection cell having any one configuration of:
a configuration that the multiple-reflection apparatus is incorporated in the cell body,
a configuration that the cell body is disposed between the parallel plane mirrors of the multiple-reflection apparatus, and
a configuration that a part of the cell body is formed by the multiple-reflection apparatus.

4. The multiple-reflection apparatus of claim 1 comprising:
an optical element for incidence that guides the laser light to at least one of the parallel mirror surfaces, wherein the optical element includes a drive device for incidence that changes the position and direction of the optical element for changing the angle $\varphi$ of incidence.

5. The multiple-reflection apparatus of claim 4, wherein the drive device changes the angle $\varphi$ of incidence such that an angle $\varphi x$ of which the angle $\varphi$ of incidence is projected to the x-y plane changes within a range of 0° to 25°.

6. The multiple-reflection apparatus of claim 4, wherein the drive device changes the angle $\varphi z$ between the incident direction of the laser light and the x-y plane such that a number of reciprocations of the multiple-reflection light between the right-angle double mirrors on the one end side and the other end side increases or decreases for N times (N is an integer of 1 or greater).

7. The multiple-reflection apparatus of claim 4, wherein the drive device changes the angle $\varphi x$ of which the angle $\varphi$ of incidence is projected to the x-y plane such that a number of reciprocations of the laser light between the parallel plane mirrors from the first right-angle double mirror on the one end side to the second right-angle double mirror on the other end side increase or decrease for M times (M is an integer of 1 or greater).

8. The multiple-reflection apparatus of claim 1 comprising:
an optical element for incidence that guides the laser light to at least one of the parallel mirror surfaces, wherein the optical element includes a drive device for the parallel plane mirrors that changes the positions and directions of the parallel plane mirrors and the right-angle double mirrors integrally relative to the optical element for incidence for changing the angle $\varphi$ of incidence.

9. The multiple-reflection apparatus of claim 8, wherein the drive device changes the angle $\varphi$ of incidence such that an angle $\varphi x$ of which the angle $\varphi$ of incidence is projected to the x-y plane changes within a range of 0° to 25°.

10. The multiple-reflection apparatus of claim 8, wherein the drive device changes the angle $\varphi z$ between the incident direction of the laser light and the x-y plane such that a number of reciprocations of the multiple-reflection light between the right-angle double mirrors on the one end side and the other end side increases or decreases for N times (N is an integer of 1 or greater).

11. The multiple-reflection apparatus of claim 8 wherein the drive device changes the angle $\varphi x$ of which the angle $\varphi$ of incidence is projected to the x-y plane such that a number of reciprocations of the laser light between the parallel plane mirrors from the first right-angle double mirror on the one end side to the second right-angle double mirror on the other end side increase or decrease for M times (M is an integer of 1 or greater).

* * * * *